US008675602B2

(12) United States Patent
Yang et al.

(10) Patent No.: US 8,675,602 B2
(45) Date of Patent: Mar. 18, 2014

(54) METHODS FOR AN UPLINK POWER CONTROL MECHANISM

(75) Inventors: Rongzhen Yang, Shanghai (CN); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 12/903,009

(22) Filed: Oct. 12, 2010

(65) Prior Publication Data

US 2012/0087337 A1   Apr. 12, 2012

(51) Int. Cl.
*H04W 4/00* (2009.01)
*H04B 7/00* (2006.01)

(52) U.S. Cl.
USPC .......................................... 370/331; 455/522

(58) Field of Classification Search
USPC ....................................................... 370/331
See application file for complete search history.

(56) References Cited

U.S. PATENT DOCUMENTS

| | | | | |
|---|---|---|---|---|
| 7,397,871 | B2 * | 7/2008 | Wiss et al. | 375/340 |
| 2007/0265026 | A1 * | 11/2007 | You et al. | 455/522 |
| 2008/0205325 | A1 * | 8/2008 | Lu et al. | 370/320 |
| 2008/0298315 | A1 | 12/2008 | Ihm et al. | |
| 2009/0296661 | A1 * | 12/2009 | Lee et al. | 370/335 |
| 2010/0027462 | A1 | 2/2010 | Lee et al. | |
| 2010/0046357 | A1 * | 2/2010 | Sampath et al. | 370/209 |
| 2010/0046491 | A1 * | 2/2010 | Vermani et al. | 370/342 |
| 2010/0255871 | A1 * | 10/2010 | Chin et al. | 455/522 |
| 2011/0194423 | A1 * | 8/2011 | Cho et al. | 370/252 |
| 2011/0286502 | A1 * | 11/2011 | Adachi et al. | 375/219 |

FOREIGN PATENT DOCUMENTS

| | | |
|---|---|---|
| EP | 2175684 A1 | 4/2010 |
| KR | 10-2007-0036004 A | 4/2007 |
| WO | 2012051212 A1 | 4/2012 |

OTHER PUBLICATIONS

Draft Amendment to IEEE Standard for Local and metropolitan area networks, Part 16: Air Interface for Fixed and Mobile Broadband Wireless Access Systems, IEEE, 2010, 797 pages.
Signaling Support for 16m ULPC Initial Stage (IEEE 802.16m/D4 Amendment), IEEE 802.16 Broadband Wireless Access Working Group <http://ieee802.org/16>, Mar. 15, 2010, 6 pages.
IEEE 802.16m System Description Document [Draft], IEEE 802.16 Broadband Wireless Access Working Group <http://ieee802.org/16>, Feb. 7, 2009, 171 pages.
IEEE 802.16m System Requirements, IEEE 802.16 Broadband Wireless Access Working Group <http://ieee802.org/16>, Jan. 15, 2009, 31 pages.
International Search Report and Written Opinion Received for PCT Patent Application No. PCT/US2011/55837, Mailed on Feb. 28, 2012, 10 pages.
International preliminary report on patentability and Written Opinion received for PCT Patent Application No. PCT/US2011/055837, mailed on Apr. 25, 2013, 6 Pages.

* cited by examiner

*Primary Examiner* — Guang Li
(74) *Attorney, Agent, or Firm* — Cool Patent, P.C.; Kenneth J. Cool; Joseph P. Curtin (57) ABSTRACT

A method for an uplink power control mechanism is presented. In one embodiment, the method includes receiving an allocation information element (IE) in conjunction with a ranging process. The method includes processing the allocation information element to determine power control parameters including a first parameter about offset control and a second parameter about noise and interference level. The method also includes calculating the power value for each channel based at least in part on two or more power control parameters.

19 Claims, 4 Drawing Sheets

METHODS FOR AN UPLINK POWER CONTROL MECHANISM

FIELD OF THE INVENTION

Embodiments of the invention relate to the field of mobile network communication.

BACKGROUND OF THE INVENTION

Mobile Worldwide Interoperability for Microwave Access (WiMAX) is a broadband wireless access technology based on Institute of Electrical and Electronics Engineers (IEEE) 802.16 standard. Mobile WiMAX uses a scalable orthogonal frequency division multiple access (OFDMA) scheme to deliver wireless broadband packet data services to mobile terminals. Other OFDMA-based wireless broadband technologies include 3GPP LTE and 3GPP UMB.

A wireless broadband communication server may apply various techniques to mitigate the interference experienced by client (e.g., a mobile station) or to reduce the interference to other cells. The techniques may include sub-channels scheduling, dynamic transmit-power control, dynamic antenna-pattern adjustment, and dynamic modulation and coding scheme. As an example, uplink power control is supported for both an initial calibration and periodic adjustment on transmit power without loss of data. An uplink power-control algorithm determines the transmission power of an OFDM symbol to compensate for the pathloss, shadowing and fast fading.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

A method for an uplink power-control mechanism is presented. In one embodiment, the method includes receiving an allocation information element (IE) in conjunction with a ranging process. The method includes processing the allocation information element to determine power-control parameters including a first parameter about offset control and a second parameter about noise and interference level. The method also includes calculating the power value for each channel based at least in part on two or more power-control parameters.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for setting power-control parameters. Specifically, setting power-control parameters is discussed in reference to a computer system. The methods and apparatus for setting power-control parameters are, however, not so limited, as they may be implemented on or in association with any integrated circuit device or system, such as cell phones, personal digital assistants, embedded controllers, mobile platforms, desktop platforms, and server platforms, as well as in conjunction with other resources.

Overview

A method for an uplink power-control mechanism is presented. In one embodiment, the method includes receiving an allocation information element (IE) in conjunction with a ranging process. The method includes processing the allocation information element to determine power-control parameters including a first parameter about offset control and a second parameter about noise and interference level. The method also includes calculating the power value for each channel based at least in part on two or more power-control parameters.

Figure 1:
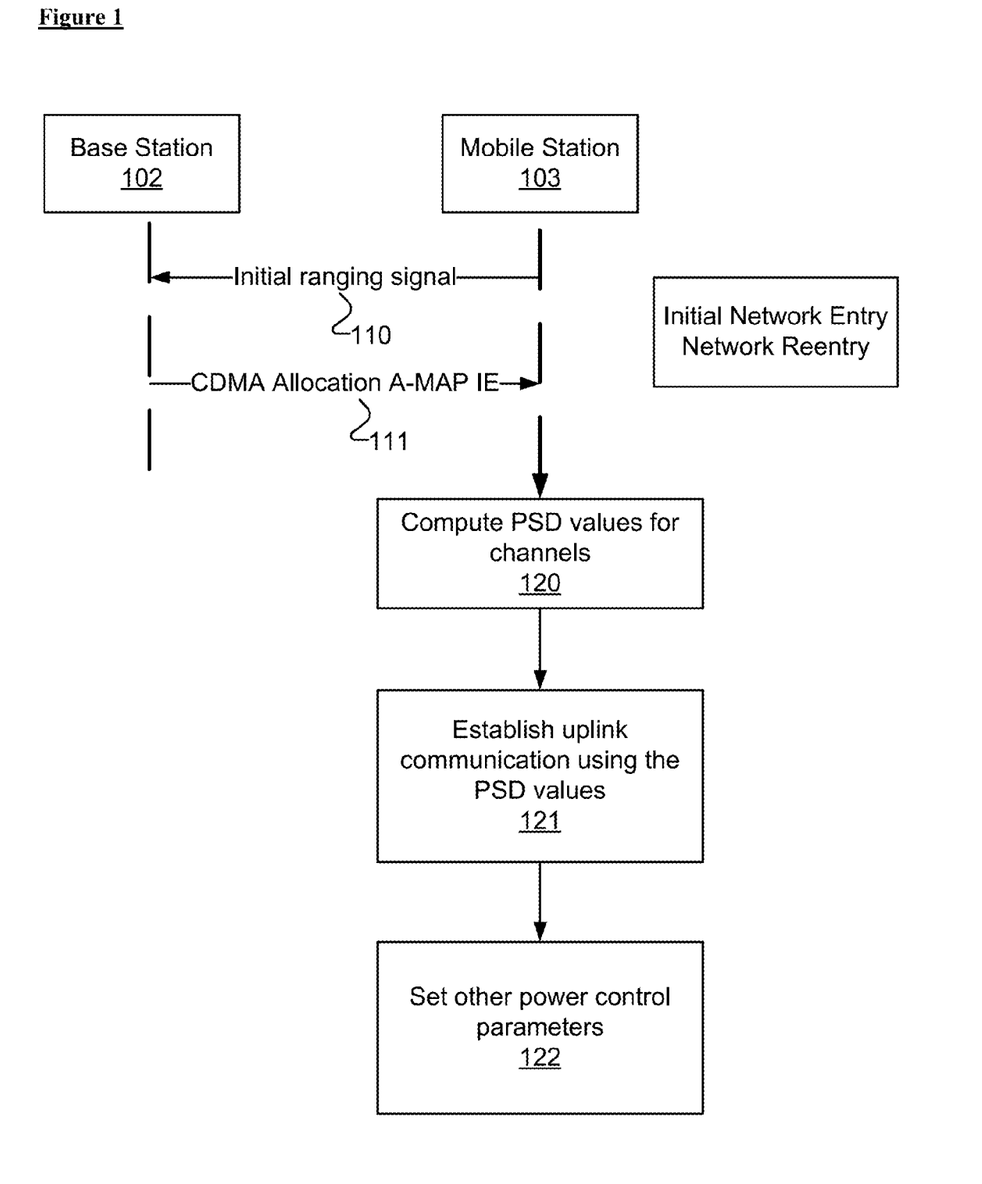
FIG. 1 shows a flow diagram of one embodiment of a process to determine uplink power control parameters.

FIG. 1 shows a flow diagram of one embodiment of a process to determine uplink power-control parameters. Many related components peripherals have not been shown to avoid obscuring the invention. Referring to FIG. 1, the system includes base station 102 and mobile station 103.

In one embodiment, during initial network entry or network re-entry, mobile station 103 starts an initial ranging process to access the network, for example, by sending initial ranging signal 110 to base station 102.

In one embodiment, when base station 102 successfully receives initial ranging signal 110 from mobile station 103, base station 102 sends CDMA (code division multiple access) allocation IE 111 to mobile station 103. In one embodiment, CDMA allocation IE 111 is for initial resource allocation to support establishing uplink communication.

In one embodiment, mobile station 103 determines one or more uplink power-control parameters based at least in part on data in the CDMA allocation IE. The uplink power-control parameters include an offset control parameter and a noise and interference (NI) level parameter.

In one embodiment, mobile station 103, calculates a power value, such as, for example, the uplink transmission power spectral density (PSD) value based at least on uplink power-control parameters (process block 120). In one embodiment, mobile station 103 calculates a PSD value for each channel.

In one embodiment, after the uplink transmission PSD value for each channel has been calculated, mobile station 103 uses the PSD values to support uplink transmission in communication with base station 102 (process block 121).

In one embodiment, mobile station 103 sets or updates power-control parameters in response to receiving a system configuration descriptor message, an uplink power-adjustment message, or an uplink noise and interference level broadcast message. Power-control parameters signaled in the messages will be updated when mobile station 103 receives any of the messages.

In one embodiment, the system configuration descriptor message is an AAI_SCD message. An AAI_SCD message is transmitted by base station 102 at a periodic interval to define a system configuration. In one embodiment, the uplink noise and interference level broadcast message is an AAI_ULPC_NI message. An AAI_ULPC_NI message broadcasts NI values for the UL (uplink) power control. In one embodiment, the uplink power-adjustment message is an AAI_UL_POWER_ADJ message. An AAI_UL_POWER_ADJ message is transmitted by base station 102 to control the transmit power level of mobile station 103.

CDMA Allocation A-MAP IE

In one embodiment, CDMA allocation IE 111 is the CDMA Allocation Advanced-MAP information element (CDMA Allocation AMAP IE). The CDMA Allocation AMAP IE includes data such as, for example, IoTFP and OffSetControl.

In one embodiment, IoTFP is an interference over thermal noise (IoT) level of the frequency partition used for mobile station 103 resource assignment, quantized in 0.5 dB steps as IoT level from 0 dB to 63.5 dB. In one embodiment, IoTFP is also sent in conjunction with an AAI_ULPC_NI message.

In one embodiment, OffsetControl is the transmit power-adjustment value transmitted by the base station 102. The OffsetControl represents the value among −15.5 to 16 dB with 0.5 dB step.

In one embodiment, when mobile station 103 has only successful received the CDMA Allocation AMAP IE, mobile station 103 sets NI and offsetControl by referring to values from the CDMA Allocation AMAP IE. In one embodiment, other uplink power control parameters are determined by the values listed in Table 1 as below:

TABLE 1

Other Power Control Parameters

| Type | Parameters | Default Value | |
|---|---|---|---|
| Data Channel Control Parameters | Alpha | ½ | |
| | Beta | 0 | |
| | Gamma | 0.5 | |
| | dataSinrMin | 3 | dB |
| | dataSinrMax | 40 | dB |
| Control Channel Target SINR Value | targetHarqSinr | 2 | dB |
| | targetSyncRangingSinr | −3 | dB |
| | targetPfbchSinr | 0 | dB |
| | targetSfbchBaseSinr | 1.5 | dB |
| | targetSfbchDeltaSinr | 0.24 | dB |
| | targetBwRequestSinr | 0.5 | dB |
| | Sounding Channel SINR Target Value | 10 | dB |
| Offset Initialization | offsetData | 0 | |

In one embodiment, power-control parameters, such as, for example, NI and offsetControl, directly belong to the frequency partition of assigned data burst when multi frequency partitions are used.

In one embodiment, the power per subcarrier and per stream is based on Equation (1):

$$P(\text{dBm}) = L + SINR(\text{target}) + NI + \text{Offset} \tag{1}$$

In one embodiment, SINR(target) is the target uplink SINR received by base station 102. P is the transmission power level (dBm) per stream and per subcarrier for the current transmission. L is the estimated average current downlink propagation loss calculated by mobile station 103. The value includes mobile station 103 transmit antenna gain and path loss.

In one embodiment, NI is the estimated average power level (dBm) of the noise and interference per subcarrier at base station 102. In one embodiment, NI is sent in conjunction with the AAI_ULPC_NI message.

Offset is a correction term for the mobile station-specific power offset. It is controlled by base station 102 through power-control messages. In one embodiment, there are two kinds of offset values that are used for data and control, respectively. For a data-channel transmission, the offset is set to the value OffsetData conveyed in an AAI_UL_POWER_ADJ message. For a control-channel transmission, the Offset is set to the value OffsetControl conveyed in an AAI_UL_POWER_ADJ message.

In one embodiment, NI is calculated based at least on Equation (2):

$$NI = P(TN) + IoT + \text{delta } F \qquad (2)$$

In one embodiment, P(TN) is the thermal noise power density at 0° C. Delta F is the subcarrier spacing. All the UL noise and interference noise level are quantized in 0.5 dB steps as IoT level from 0 dB to 63.5 dB.

In one embodiment, the uplink power-control mechanism is applicable to various wireless mobile network standards, for example, IEEE 802.16m, Long Term Evolution (LTE), and extensions thereof.

In one embodiment, base station 102 is a transmitter in a downstream or downlink case. A transmitter may be interchangeably referred to as an advance base station, a base station (BS), an enhanced Node B (eNB), or an access point (AP) at the system level herein. In this downlink case, mobile station 103 is a receiver. A receiver may be interchangeably referred to as an advanced mobile station (AMS), a mobile station (MS), a subscriber station (SS), a user equipment (UE), or a station (STA) at the system level herein. Further, the terms ABS, BS, eNB, and AP may be conceptually interchanged, depending on which wireless protocol is being used, so a reference to BS herein may also be seen as a reference to either of ABS, eNB, or AP. Similarly, a reference to MS herein may also be seen as a reference to either of AMS, SS, UE, or STA.

Figure 2:
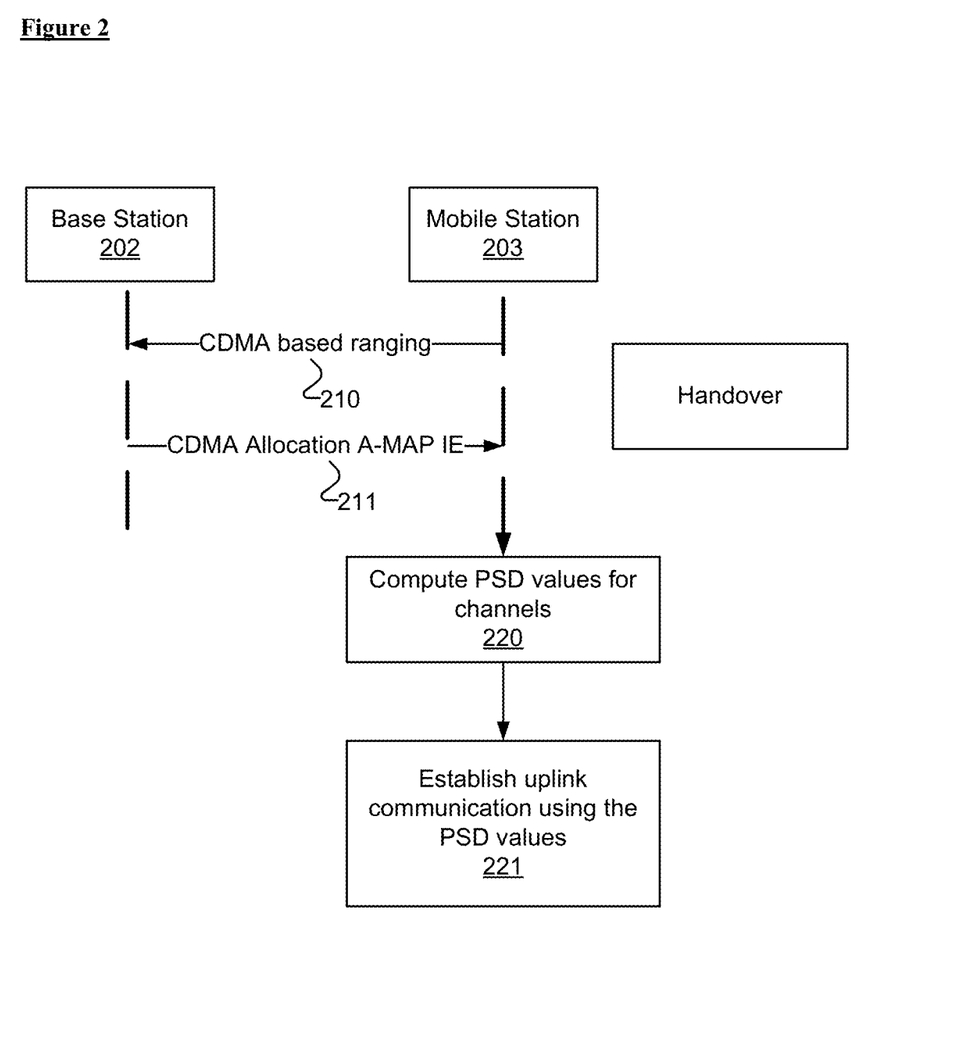
FIG. 2 shows a flow diagram of one embodiment of a process to determine uplink power control parameters during handover.

FIG. 2 shows a flow diagram of one embodiment of a process to determine uplink power control parameters during handover. Many related components peripherals have not been shown to avoid obscuring the invention. Referring to FIG. 2, the system includes base station 202 and mobile station 203.

In one embodiment, if a CDMA ranging flag in a handover command message is set to 1, mobile station 203 performs CDMA based ranging (210). In one embodiment, the CDMA ranging flag is referred to as CDMA_RNG_FLAG. The handover command message is an AAI_HO-CMD message.

In one embodiment, the power-control parameters of the target base station (e.g., base station 202) are determined similar to the process with respect to FIG. 1. Base station 202 sends CDMA (code division multiple access) allocation IE 211 to mobile station 203.

In one embodiment, mobile station 203 determines one or more uplink power-control parameters based at least in part on data in the CDMA allocation IE. The uplink power-control parameters include an offset control parameter and a noise and interference (NI) level parameter.

In one embodiment, mobile station 203 calculates a power value, such as, for example, the uplink transmission power spectral density (PSD) value based at least on uplink power-control parameters (process block 220). In one embodiment, mobile station 203 calculates a PSD value for each channel.

In one embodiment, after the uplink transmission PSD value for each channel has been calculated, mobile station 203 uses the PSD values to support uplink transmission in communication with base station 202 (process block 221).

In one embodiment, before the handover procedure finishes, mobile station 203 stores two sets of uplink power-control parameters to support uplink transmission to the serving base station and the target base station separately.

In one embodiment, after handover, if mobile station 203 successfully receives any of the AAI_SCD, AAI_ULPC_NI, or AAI_UL_POWER_ADJ messages from target base station, the signaled uplink power-control parameters will be updated accordingly.

In one embodiment, during the handover process, if a CDMA ranging flag in a handover command message is set to 0, mobile station 203 skips CDMA based ranging. In one embodiment, the power-offset values for a target base station (e.g., base station 202) is included the AAI HO CMD message. Other uplink power-control parameters for the target base station are set by using the referring to values used by the serving base station.

In one embodiment, the AAI_HO_CMD message includes offset data and offset control if CDMA_RNG_FLAG is set to 0. In one embodiment, Offset data presents when CDMA_RNG_FLAG=0. It represents the value among −31.5 to 32 dB with 0.5 dB step. Offset control presents when CDMA_RNG_FLAG=0. It represents the value among −31.5 to 32 dB with 0.5 dB step.

Figure 3:
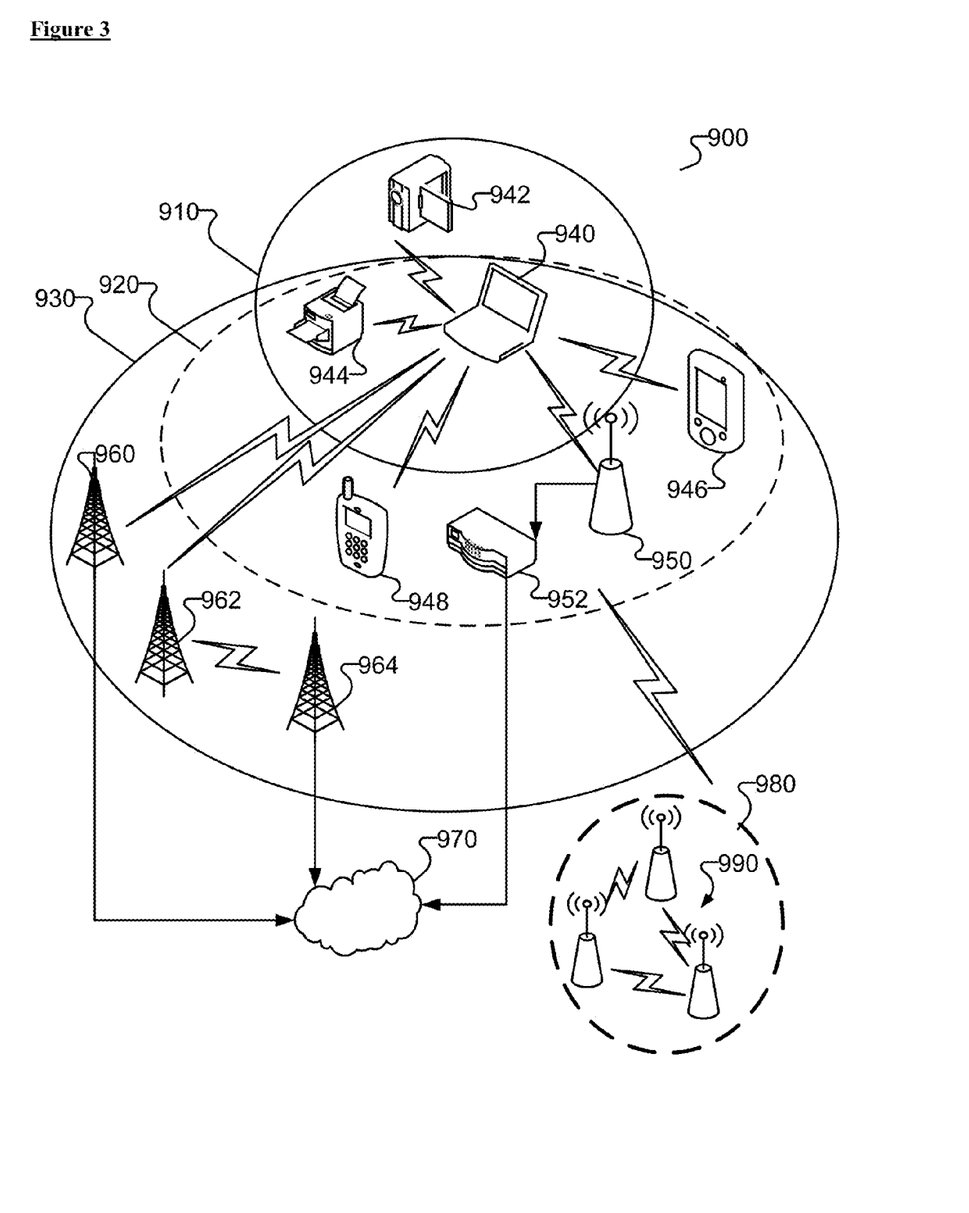
FIG. 3 is a diagram representation of a wireless communication system in accordance with one embodiment of the invention.

FIG. 3 is a diagram representation of a wireless communication system in accordance with one embodiment of the invention. Referring to FIG. 3, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart-rate monitor, a blood-pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread-spectrum modulation (e.g., direct-sequence code division multiple access (DS-CDMA), frequency-hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct-sequence spread-spectrum (DSSS) modulation, frequency-hopping spread-spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies. In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 3 depicts a WPAN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high-performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 4:
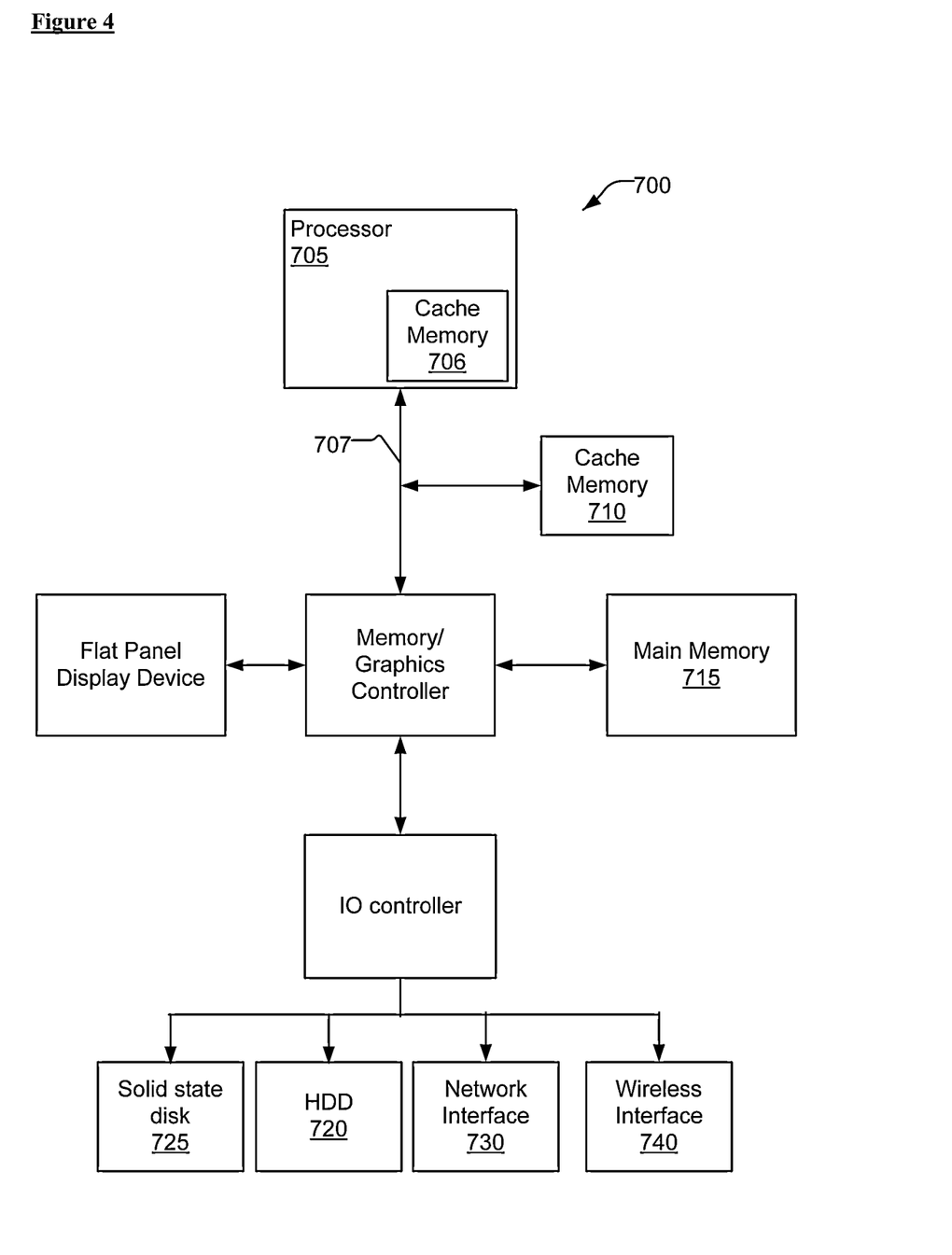
FIG. 4 illustrates a computer system for use with one embodiment of the present invention.

FIG. 4 illustrates an example of a computer system in conjunction with one embodiment of the invention. Processor 705 accesses data from level 1 (L1) cache memory 706, level 2 (L2) cache memory 710, and main memory 715. In one embodiment, cache memory 710 is a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for a wireless communication network, the method comprising:
   starting a ranging process;
   receiving an allocation information element;
   processing the allocation information element to determine at least power-control parameters, wherein the power-control parameters include a first parameter about offset control and a second parameter about noise and interference level, the second parameter being based on a thermal noise power density at 0° C., an interference over thermal noise level of a frequency partition and a subcarrier spacing at a transmitting station; and
   calculating a power value for one or more channels based at least in part on the first and second parameters.

2. The method of claim 1, wherein the ranging process is part of an initial network entry/reentry process.

3. The method of claim 1, wherein the ranging process is part of a CDMA (code division multiple access) based ranging process and a CDMA ranging flag is set in a CDMA handover command message.

4. The method of claim 1, wherein the power-control parameters are uplink power-control parameters.

5. The method of claim 1, further comprising establishing uplink communication based at least on the power value, wherein the power value is a power spectral density value.

6. The method of claim 1, further comprising setting one or more power-control parameters in response to receiving a system configuration descriptor message, an uplink power-adjustment message, or an uplink noise and interference level broadcast message.

7. The method of claim 1, wherein the ranging process is part of a CDMA based ranging process in conjunction with a handover process.

8. The method of claim 1, further comprising storing a first set and a second set of uplink power control parameters to support uplink transmission to a serving base station and to a target base station respectively.

9. The method of claim 1, wherein the allocation information element is a CDMA allocation advanced MAP information element.

10. A method for a wireless communication network, the method comprising:
    receiving a ranging signal; and
    sending, in response to the ranging signal, an allocation information element which includes data for use to determine two or more uplink power-control parameters, wherein the uplink power-control parameters include at least information about a noise and interference level, the information about the noise and interference level comprising a thermal noise power density at 0° C., an interference over thermal noise level of a frequency partition and a subcarrier spacing at a transmitting station.

11. The method of claim 10, wherein the ranging signal is received from a mobile station, wherein the ranging signal is an initial network entry ranging signal or a CDMA based ranging signal.

12. The method of claim 10, wherein the allocation information element is a CDMA allocation advanced-MAP information element.

13. The method of claim 10, further comprising sending other uplink power-control parameters in conjunction with a system configuration descriptor (SCD) message, an uplink power-adjustment message, or an uplink noise and interference level (NI) broadcast message.

14. A network system, comprising
    a processor;
    a memory coupled to the processor; and
    a communication device coupled to the processor to communicate wirelessly over multiple sub-channels in an orthogonal frequency division multiple (OFDM) wireless network, wherein the communication device is operable to
    send a ranging signal;
    process an allocation information element to determine uplink power-control parameters, wherein the uplink power-control parameters include at least an offset control parameter and a noise and interference level parameter, the noise and interference level parameter comprising a thermal noise power density at 0° C., an interference over thermal noise level of a frequency partition and a subcarrier spacing at a transmitting station; and
    compute a power spectral density value for each channel based at least in part on the uplink power-control parameters.

15. The system of claim 14, wherein the ranging signal is a CDMA based ranging signal during a handover process.

16. The system of claim 14, wherein the ranging signal is sent in conjunction with a network entry/reentry process.

17. The system of claim 14, wherein the communication device is operable to store two sets of uplink power-control parameters until a handover process completes.

18. The system of claim 14, wherein communication device is operable to establish uplink communication based at least on the power spectral density value.

19. The system of claim 14, wherein the allocation information element is a CDMA allocation advanced MAP information element.

* * * * *